United States Patent
Thaliath et al.

(10) Patent No.: US 11,159,987 B2
(45) Date of Patent: Oct. 26, 2021

(54) METHOD AND APPARATUS FOR CONFIGURING A COMMUNICATION NETWORK

(71) Applicant: Nokia Solutions and Networks Oy, Espoo (FI)

(72) Inventors: Joseph Thaliath, Bangalore (IN); Prasanna Km, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 53 days.

(21) Appl. No.: 16/814,960

(22) Filed: Mar. 10, 2020

(65) Prior Publication Data
US 2020/0296630 A1   Sep. 17, 2020

(30) Foreign Application Priority Data
Mar. 15, 2019   (EP) .................................... 19163112

(51) Int. Cl.
*H04W 72/00* (2009.01)
*H04W 28/18* (2009.01)
*H04W 16/02* (2009.01)
*H04W 24/00* (2009.01)

(52) U.S. Cl.
CPC ........... *H04W 28/18* (2013.01); *H04W 16/02* (2013.01); *H04W 24/00* (2013.01)

(58) Field of Classification Search
CPC ..... H04W 28/18; H04W 16/02; H04W 24/00; H04W 24/08; H04W 24/02; H04W 28/16
USPC ....................................................... 455/450
See application file for complete search history.

(56) References Cited

U.S. PATENT DOCUMENTS

| 8,737,359 | B2* | 5/2014 | Catovic ............... H04W 36/305 370/332 |
| 10,039,016 | B1* | 7/2018 | Larish ................... H04W 24/02 |
| 2005/0153702 | A1 | 7/2005 | Cuffaro et al. |
| 2005/0239472 | A1* | 10/2005 | Wei ....................... H04W 36/20 455/452.2 |
| 2017/0111916 | A1* | 4/2017 | Corroy ............. H04W 72/0426 |
| 2018/0124800 | A1* | 5/2018 | Arnold ............... H04W 72/085 |

(Continued)

FOREIGN PATENT DOCUMENTS

| CN | 103369534 A | 10/2013 |
| WO | 2018/068857 A1 | 4/2018 |

OTHER PUBLICATIONS

Binathi et al., "An Experimental Study of Genetic Algorithm for Spectrum Optimization in Cognitive Radio Networks", IEEE Students' Conference on Electrical, Electronics and Computer Science, Mar. 1-2, 2014, 4 pages.

(Continued)

*Primary Examiner* — Amancio Gonzalez
(74) *Attorney, Agent, or Firm* — Nokia Technologies Oy

(57) ABSTRACT

Embodiments relate to an apparatus (2) comprising means configured for:
receiving (T1), from an apparatus (4) associated with a radio cell, data specifying cell level parameters and computing resources availability,
selecting (T2), based on the cell level parameters and computing resources availability, a set of radio resources management algorithms,
sending (T3), to the apparatus (4) associated with the radio cell, data specifying the selected set of radio resources management algorithms.

15 Claims, 2 Drawing Sheets

(56) References Cited

U.S. PATENT DOCUMENTS

2018/0351808 A1   12/2018   Das

OTHER PUBLICATIONS

Saatsakis et al., "Cognitive Radio Resource Management for Improving the Efficiency of LTE Network Segments in the Wireless B3G World", IEEE Symposium on New Frontiers in Dynamic Spectrum Access Networks, Oct. 14-17, 2008, pp. 1-5.
Extended European Search Report received for corresponding European Patent Application No. 19163112.6, dated Sep. 13, 2019, 14 pages.
Office action received for corresponding European Patent Application No. 19163112.6, dated Apr. 9, 2021, 12 pages of office action.

* cited by examiner

METHOD AND APPARATUS FOR CONFIGURING A COMMUNICATION NETWORK

FIELD OF THE INVENTION

The present invention relates to the field of telecommunication. In particular, the present invention relates to a method and an apparatus for configuring a communication network.

BACKGROUND

In a wireless communication network, for example a cellular wireless communication network, a wireless access node typically applies a set of Radio Resources Management algorithms with the aim to optimize spectrum efficiency. Generally, the Radio Resources Management algorithms that are selected for implementation in products are those which fit most of the cell scenarios with limited usage of computing resources and reasonable spectral efficiency. However, given the varying nature of cell characteristics, the selected set of Radio Resources Management algorithms may not provide optimized efficiency in all scenarios.

SUMMARY

It is thus an object of embodiments of the present invention to propose a method and an apparatus for configuring a communication network, which do not show the inherent shortcomings of the prior art.

Accordingly, embodiments relate to an apparatus comprising means configured for:
receiving, from an apparatus associated with a radio cell, data specifying cell level parameters and computing resources availability,
selecting, based on the cell level parameters and computing resources availability, a set of radio resources management algorithms,
sending, to the apparatus associated with the radio cell, data specifying the selected set of radio resources management algorithms.

Embodiments also relate to a computer-implemented method for configuring a communication network, comprising:
receiving, from an apparatus associated with a radio cell, data specifying cell level parameters and computing resources availability,
selecting, based on the cell level parameters and computing resources availability, a set of radio resources management algorithms,
sending, to the apparatus associated with the radio cell, data specifying the selected set of radio resources management algorithms.

In some embodiments, selecting a set of radio resources management algorithms is based on predicted performance metrics and a comparison between computing resources needs of the selected set of radio resources management algorithms and computing resources availability.

In some embodiments, selecting a set of radio resources management algorithms comprises:
determining performance metrics for a plurality of sets of radio resources management algorithms,
determining computing resources needs for said plurality of sets,
selecting one of the sets which has computing resources needs lower than available computing resources, based on the performance metrics.

In some embodiments, determining performance metrics is based on a first machine learning model configured to predict performance metrics, and/or determining computing resources needs is based on a second machine learning model configured to predict computing resources needs.

In some embodiments, said means are further configured for:
receiving, from the apparatus associated with a radio cell, data specifying cell performance metrics and/or computing resources consumption of for respective radio resources management algorithms,
updating said first machine learning model and/or said second machine learning model based on the received performance metrics and/or computing resources consumption.

In some embodiments, said means are further configured for:
selecting, based on the cell level parameters and computing resources availability, parameters for the selected set of radio resources management algorithms,
sending, to the apparatus associated with the radio cell, data specifying the selected parameters.

In some embodiments, selecting a set of radio resources management algorithms comprises selecting among at least a first beam pairing algorithm, a second beam pairing algorithm, a first frequency selective scheduling algorithm, a second frequency selective scheduling algorithm.

In some embodiments, said means are further configured for sending, to the apparatus associated with the radio cell, data specifying a list of cell level parameters and computing resources availability.

Embodiments also relate to an apparatus comprising means configured for:
executing a first set of radio resources management algorithms,
sending, to an apparatus associated with a communication network, data specifying cell level parameters and computing resources availability,
receiving, from the apparatus associated with the communication network, data specifying a second set of radio resources management algorithms,
executing the second set of radio resources management algorithms.

Embodiments also relate to a computer-implemented method comprising:
executing a first set of radio resources management algorithms,
sending, to an apparatus associated with a communication network, data specifying cell level parameters and computing resources availability,
receiving, from the apparatus associated with the communication network, data specifying a second set of radio resources management algorithms,
executing the second set of radio resources management algorithms.

In some embodiments, said means are further comprising for receiving, from the apparatus associated with a communication network, data specifying a list of cell level parameters and computing resources availability, and
wherein sending data specifying cell level parameters and computing resources availability is based on said list.

Embodiments also relates to a wireless access node, such as a base station, comprising an apparatus as defined above.

In some embodiments, said means comprise at least one processor and at least one memory, the memory storing computer program code, the memory and the computer program code being configured for, with the processor, cause the apparatus to function as defined above.

Embodiments also relate to a computer program comprising instructions for performing the method mentioned before when said instructions are executed by a computer. The computer program may be stored on a computer readable medium. The computer readable medium may be a non-transitory computer readable medium.

BRIEF DESCRIPTION OF THE DRAWINGS

The above and other objects and features of the invention will become more apparent and the invention itself will be best understood by referring to the following description of embodiments taken in conjunction with the accompanying drawings wherein.

DESCRIPTION OF EMBODIMENTS

Figure 1:
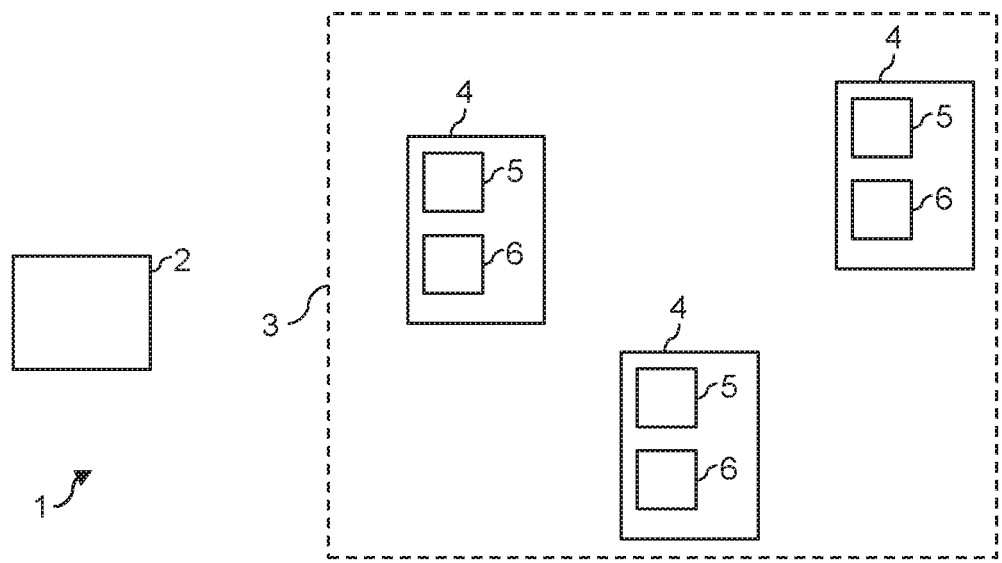
FIG. 1 is a block diagram of a communication network.

FIG. 1 is a block diagram of a communication network 1. The communication network 1 comprises a configuration device 2 and a Radio Access Network 3. The Radio Access Network 3 comprises a plurality of wireless access nodes 4.

The configuration device 2 is configured for communication with access nodes 4. In particular, the configuration device 2 may receive operational data from an access node 4, specifying the functioning of the access node 4. For example, an access node 2 is configured for sending operational data to the configuration device 2 on a regular basis and/or in response to a request from the control device 2. Also, the configuration device 2 may send configuration data to an access node 4, to control the functioning of the access node 4. The configuration device 2 may determine the configuration data for an access node 4 based on the operational data associated with the access node 4, thereby adapting the functioning of the access node 4 to current conditions. Functioning of the configuration device 2 is described in more details with reference to FIGS. 3 and 4.

In some embodiments, the configuration device 2 may correspond to or be included in a RAN Intelligent Controller as specified by the O-RAN Reference Architecture of the O-RAN Alliance. The communication between the configuration device 2 and an access node 4 may be based on a standardized interface, for example based on interface E2 as specified by the O-RAN Alliance.

In some embodiments, the configuration device 2 corresponds to a combination of hardware and software in a cloud environment, for example a Cloud-RAN platform.

An access node 4 provides wireless connectivity to one or more user equipments (UEs), for example based on standardized radio protocols. An access node 4 may correspond, at least in part, to a base station, a NodeB, an eNodeB, a gNodeB . . . and use 3GPP standards for wireless communication with UEs, such as 4G/LTE or 5G standards. An access node 4 is associated with one or more radio cells.

An access node 4 comprises a control device 5 and a radio unit 6. The control device 5 includes computing resources, such as one or more processors and one or more memory. The computing resources are used by the control device 5 to perform various functions for controlling the functioning of the radio unit 6. Examples of functions that may be executed by the control device 5 include packet scheduling, which may include Multi-User MIMO beam pairing, Frequency Selective Scheduling and other scheduling-related algorithms. The radio unit 6 process, receives and emits radio signals under control of the control device 5. Functioning of the access node 4 and in particular the control device 5 is described in more details with reference to FIG. 2.

In some embodiments, the control unit 5 of an access node 4 presents a distributed architecture or split architecture. For example, some of the computing resources are located near the radio unit 6, and other computing resources are located at a distance of the radio unit 6, for example in a could environment such as a Cloud RAN platform or an Edge Cloud platform. This may correspond to a CU/DU split architecture.

Figure 2:
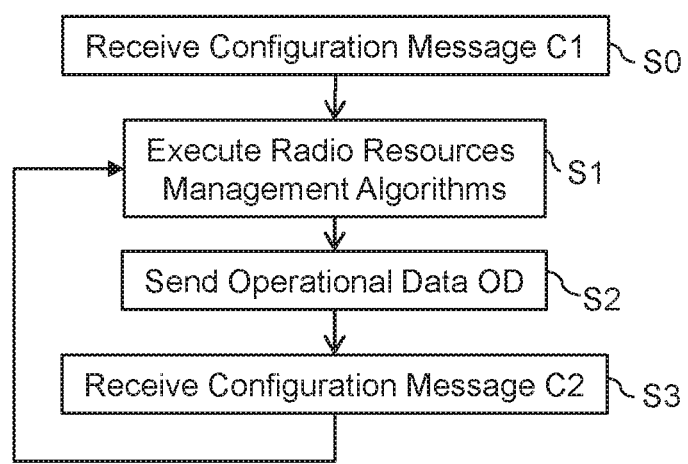
FIGS. 2 to 5 are flowcharts of methods executed in the communication network of FIG. 1.

FIG. 2 is a flowchart of a method executed by a wireless access node 4. More specifically, steps of FIG. 2 may be executed by the control device 5.

A control device 5 monitors cell level parameters which describe the functioning of the radio cell of the access node 4. The values of the cell level parameters may change dynamically and may be regularly updated, for example each Transmission Time Interval (TTI). Example of cell level parameters include:

number of UEs number of beams with UEs to be scheduled

Number of UEs per beam, or the degree of spatial separation between users (which can be derived from user's best beam type feedback or from SRS in case of a TDD system)

UE traffic type (for example Full Buffer traffic, Voice, GBR, non-GBR . . . )

Coherence Bandwidth (Which can be inferred from sub-bands CQI reports)

A control device 5 also maintains operational cell context, which include for example cell level parameters and configuration parameters, for example set by an OAM function (Operational and Maintenance).

A control device 5 also monitors availability of its computing resources. For a processor, the availability of computing resources may be expressed as a number which specifies how much processing capacity is currently used or, in contrast, how much processing capacity is currently available. This may be an absolute number or expressed as a percentage of a nominal processing capacity. For a memory, the availability of computing resources may be expressed as a number which specifies how much memory capacity is currently used or, in contrast, how much memory capacity is currently available. This may be an absolute number or expressed as a percentage of a nominal memory capacity. In some embodiments, the available computing resources of the control device 5 may be expressed as a vector which includes the above numbers for respective processors and memories. In some embodiments, the numbers for two or more processors and/or the numbers for two or more memories are aggregated.

A control device 5 may execute one or more Radio Resource Management algorithms. A plurality of Radio Resources Management algorithms may be available for execution, and at a given time a sub-set of the available algorithms is selected and executed. The subset of selected algorithm may change over time. Parameters used for executing an algorithm may also change over time. Example of available Radio Resources Management algorithms and parameters include:

Beam pairing algorithm variant 1 (parameters: Beam-skipping distance, MU-MBO layers, spatial separation between users . . . )

Beam pairing algorithm variant 2 (same parameters as above)

Frequency Selective Scheduling variant 1, (parameters: number of UE considered for the Frequency Selective Scheduling algorithm . . . )

Frequency Selective Scheduling variant 2 (same parameters as above).

A control device 5 may be configured for determining cell performance metrics. Example of cell performance metrics include spectral efficiency, cell throughput . . . .

A control device 5 may be configured for determining the processing resources consumptions of currently executed algorithms. For example, the execution time for respective algorithms is measured separately (eg: how much time it took to execute an algorithm within one TTI). The values reported could be average across multiple TTI within the measurement interval or $95^{th}$ percentile value within the reporting interval.

At a given time, the access node 4 receives, from the control device 2, a configuration message C1 (Step S0). The configuration message C1 specifies operational data that should be reported to the configuration device 2. For example, the configuration message C1 specifies a list of cell level parameters, cell performance metrics, computing resources availability and/or processing resources consumption of respective algorithms.

The access node 4, more specifically the control device 5, executes a plurality of functions. An executed function consumes a part of the computing resources. In particular, the control device 5 executes a set of Radio Resources Management algorithms, based on given algorithm parameters (Step S1). Initially, the executed set of algorithms and the algorithm parameters may correspond to a default or preconfigured set of algorithms and parameters.

The access node 4 sends operational data OD to the configuration device 2 (Step S2). The operational data OD specifies the values of cell level parameters, cell performance metrics, computing resources availability and/or processing resources consumptions for respective algorithms. In particular, the operational data OD include the cell level parameters, performance metrics, computing resources availability and/or processing resources consumptions for respective algorithms as specified by the configuration message C1.

Then, the access node 4 receives, from the control device 2, a configuration message C2 (Step S3). The configuration message C2 specifies a set of Radio Resources Management algorithms selected by the control device 2 based on the operational data OD. The configuration message C2 may also specify parameters for the selected algorithms.

Steps S1 to S3 are repeated. At a further execution of Step S1, after receiving the configuration message C2, the control device 5 executes the set of Radio Resources Management algorithms specified by the configuration message C2. The control device 5 uses the algorithm parameters specified by message C2, if any. Repeating Steps S1 to S3 may be implemented as a loop illustrated on FIG. 2. In other embodiments, Steps S1 to S3 are repeated asynchronously, for example operational data OD are reported periodically (Step S2), and configuration message C2 is received (Step S3) depending on when the configuration device 2 considers necessary to change the Radio Resources Management Algorithms.

Figure 3:
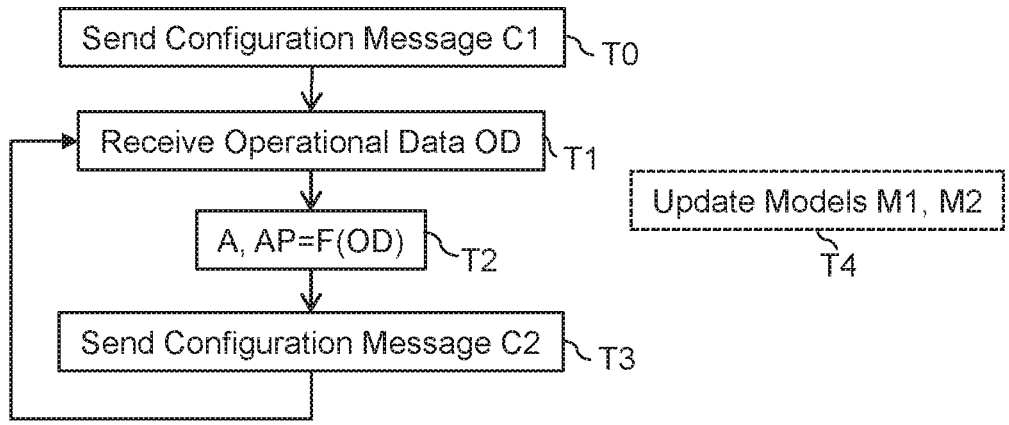

FIG. 3 is a flowchart of a method executed by the configuration device 2.

We assume that one or more performance metrics represent the performance of a radio cell of an access node 4. Example performance metric (or KPI) include spectral efficiency and throughput. At a given point in time, the performance of a radio cell depends on:

Cell level parameters P={P1, P2, P3 . . . Pk}
Algorithmic parameters AP={AP1, AP2, AP3 . . . APr}
Executed set of Radio Resources Management algorithms A={A1, A2 . . . Al}

A given Radio Resources Management algorithm performs better than another under certain scenarios and conditions. Also, the computing resources needs differ from one Radio Resources Management algorithm to another. The configuration device 2 aims at selecting a set of Radio Resources Management algorithms A and corresponding algorithm parameters AP, so as to improve or maximize the performance metrics, taking into account the constrain that the computing resources needs of the selected set of algorithms A should not exceed the available computing resources of the access node 4.

For this purpose, the configuration device 2 uses two machine learning model M1 and M2. Here, we assume that trained models M1 and M2 are available to the configuration device 2. An example of generating and training the models M1 and M2 is described hereafter with reference to FIG. 5.

The machine learning M1 is configured for predicting a performance metrics, for example spectral efficiency SE, of a radio cell, based on a set of Radio Resources Management algorithms A, algorithm parameters AP, and cell level parameters P: SE=M1(A, AP, P).

The machine learning model M2 is configured for predicting the computing resources needs R, for example CPU capacity requirements, based on a set of Radio Resources Management algorithms A, algorithm parameters AP, and cell level parameters P: R=M2(A, AP, P).

At a given time, the control device 2 sends, to an access node 4, a configuration message C1 (Step T0). The configuration message C1 specifies operational data that should be reported to the configuration device 2. For example, the configuration message C1 specifies a list of cell level parameters, performance metrics, computing resources availability and/or computing resources consumptions of respective algorithms.

The control device 2 receives operational data OD from an access node 4 (Step T1). The operational data OD specifies the values of cell level parameters, performance metrics, computing resources availability and/or computing resources consumption. In particular, the operational data OD include the cell data specified by configuration message C1.

Then, the control device 2 selects, based on the operational data OD, a set A of Radio Resources Management algorithms that should be executed by the access node 4, and related algorithm parameters AP (Step T2). The selection of step S2 comprises using the models M1 and M2 so that the computing resources needs of the selected set of algorithms A do not exceed the available computing resources of the access node 4. An example for performing the selection is described with reference to FIG. 4.

Then, the control device 2 sends a configuration message C2 to the access node 4 (Step T3). The configuration message C2 specifies the selected set A of Radio Resources Management algorithms. The configuration message C2 may also specify parameters AP for the selected algorithms.

Steps T1 to T3 may be iterated.

In some embodiments, data collected during repetition of steps T1 to T3 is used for online training of the models M1 and/or M2 (Step T4). For example, one or more data items specifying reported values of cell level parameters P, spectral efficiency SE, computing resources consumption R and associated set of algorithms A and algorithm parameters AP may be used to fine-tune the models M1 and M2, based on known model training techniques such as gradient descent.

Figure 4:
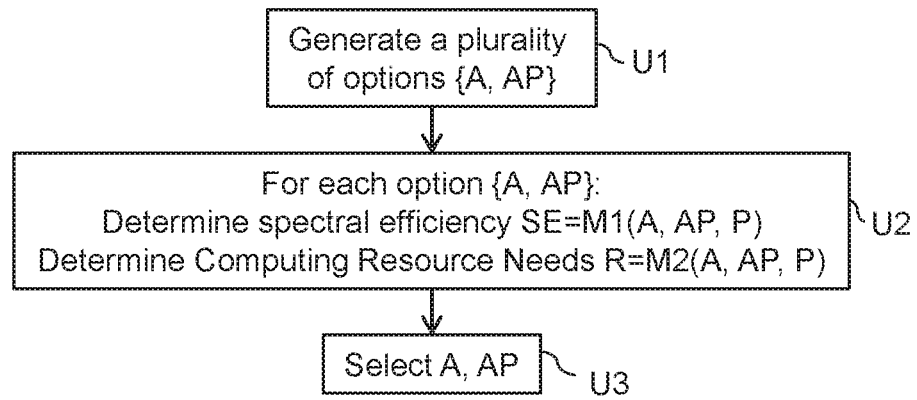

FIG. 4 is a flowchart which shows an example implementation of Step T2 of FIG. 3. At Step T2, the configuration device 2 uses the models M1 and M2 to select a set A of Radio Resources Management algorithms and related algorithm parameters AP, with the constrain that the computing resources needs of the selected set of algorithms A do not exceed the available computing resources of the access node 4.

First, the configuration device 2 generates a plurality of options (step U1). An option corresponds to a set A of Radio Resources Management algorithms and related algorithm parameters.

For example, predefined values for algorithm parameters are selected within the admissible values. For a given parameters, the predefined values may correspond to all admissible values or to a limited number of admissible values spread over an admissible interval. In that case, the plurality of options may correspond to all possible combination of available Radio Resources Management algorithms and predefined algorithm parameters values.

Then, for the generated options, the configuration device 2 determines the spectral efficiency (and/or other performance metrics) and the required computing resources, based on the models M1 and M2 (Step U2). For each option {A, AP} and for the cell level parameters P received at step T1:

E=M1(A, AP, P)
R=M2(A, AP, P)

Then, the configuration device 2 selects one of the options {A, AP} based on the determined spectral efficiencies and computing resources requirements (Step U3). For example, among the options {A, AP} which satisfy the condition that the computing resources requirements R should be lower than or equal to the available computing resources, the configuration device 2 selects the option {A, AP} with the best performance metrics, for example the highest spectral efficiency.

Figure 5:
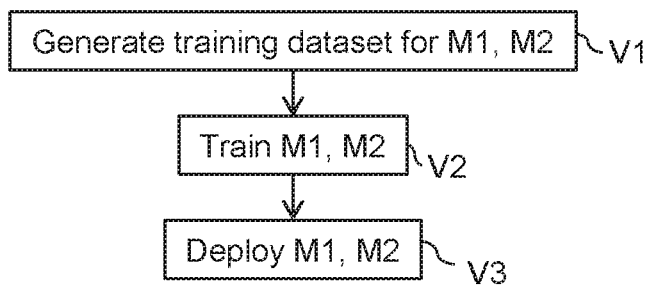

FIG. 5 is a flowchart of a method for generating the trained models M1 and M2. In some embodiments, steps of FIG. 5 are executed by the configuration device 2. In other embodiments, steps of FIG. 5 are executed by a training device (not shown), and then the trained models M1 and M2 are deployed in the configuration device 2 by the training device.

Models M1 and M2 may be neural networks trained based on supervised training. Accordingly, training datasets are generated (step V1), then the models M1 and M2 are trained based on the generated datasets (step V2). An example architecture for the neural networks is a fully-connected network.

For the model M1, a plurality of combinations of algorithms A, algorithms parameters AP and cell level parameters P is selected. Then, for each combination (A, AP, P), the corresponding performance metrics (for example the spectral efficiency) are determined. Determining the performance metrics may be based on wireless network simulations. For example, accurate simulators allow to determine the spectral efficiency SE as a function of a combination (A, AP, P). This results in a plurality of training items (A, AP, P, SE) which can be used for supervised training of the model M1.

For the model M2, a plurality of combinations (A, AP, P) is selected. For each combination (A, AP, P), the algorithms A are executed on one or more target hardware and their computing resources needs R are measured. This results in a plurality of training items (A, AP, P, R) which can be used for supervised training of the model M2. The one or more target hardware corresponds to the access node 4.

In embodiments wherein steps V1 and V2 are not executed by the configuration device 2, the models M1 and M2 are deployed in the configuration device 2 (step V3). This involves sending data representative of the architecture and/or parameters of the models to the configuration device 2.

In the system 1, an access node 4 applies Radio Resources Management algorithms to improve or optimize cell performance metrics, for example spectral efficiency. The set of Radio Resources Management algorithms, and corresponding algorithm parameters, are chosen by the configuration device 2 based on current cell level parameters and available computing resources, taking the computing resources needs of the available algorithms into account. Accordingly, the selected set of algorithms is adapted to cell conditions and this improves the performance metrics.

For example, the available algorithms include various beam-pairing algorithms of different complexity, and a cell level parameter represents the degree of spatial separation between UEs. If UEs are essentially concentrated in a few of the beams, then it will be difficult to get a lot of MU-MIMO users simultaneously. In contrast, if there is a clear separation between users, this may be easier. The configuration device 5 selects a beam-pairing algorithm of a given complexity adapted to the scenario.

For example, the available algorithms include various Frequency Selective Scheduling (FSS) algorithms of different complexity, and a cell level parameter represents the coherence bandwidth. If all sub-bands are quite similar to each other then FSS would be low. The configuration device 5 selects a Frequency Selective Scheduling algorithm of a given complexity adapted to the scenario.

In another example, a cell level parameter representing UE buffer type may be used to select a MU-MIMO beam pairing algorithm and/or an FSS algorithm.

Regular communication between the access node 4 and the configuration device 2 allows updating the selected set of algorithms when cell level parameters and/or availability of computing resources vary. Also, since the selection of a set of algorithms and related algorithm parameters is based on machine learning models, which have been trained to take into account the performance metrics and the computing resources needs in a plurality of scenarios, an appropriate selection can be made. Online training of the machine learning models may ensure that a good selection continues to be made when the system 1 and its environment change.

Figure 6:
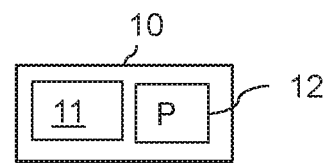
FIG. 6 is structural view of an apparatus of the communication network of FIG. 1.

FIG. 6 is a structural view of an apparatus 10. The apparatus 10 may correspond to the configuration device 2, to the access node 4, to the control device 5 or to the training device. The apparatus 10 comprises at least one processor 11 and at least one memory 12. The at least one memory 12 stores computer program code P. The at least one memory 12 and the computer program code P are configured for, with the at least one processor 6, cause the apparatus to perform, at least in part, one or more of the methods described above with reference to FIGS. 1 to 5. The processor 11 and/or the memory 12 may comprise circuitry.

It is to be remarked that the functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared, for example in a cloud computing environment. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

It should be further appreciated by those skilled in the art that any block diagrams herein represent conceptual views of illustrative circuitry embodying the principles of the invention. Similarly, it will be appreciated that any flow charts represent various processes which may be substantially represented in computer readable medium and so executed by a computer or processor, whether or not such computer or processor is explicitly shown.

While the principles of the invention have been described above in connection with specific embodiments, it is to be clearly understood that this description is made only by way of example and not as a limitation on the scope of the invention, as defined in the appended claims.

The invention claimed is:

1. Apparatus comprising at least one processor and at least one memory, the at least one memory storing computer program code, the at least one memory and the computer program code being configured for, with the at least one processor, causing the apparatus to perform:
   receiving, from an apparatus associated with a radio cell, data specifying cell level parameters and computing resources availability,
   selecting, based on the cell level parameters and computing resources availability, a set of radio resources management algorithms, and
   sending, to the apparatus associated with the radio cell, data specifying the selected set of radio resources management algorithms,
wherein selecting a set of radio resources management algorithms comprises:
   determining performance metrics for a plurality of sets of radio resources management algorithms,
   determining computing resources needs for said plurality of sets,
   selecting one of the sets which has computing resources needs lower than available computing resources, based on the performance metrics.

2. Apparatus according to claim 1, wherein determining performance metrics is based on a first machine learning model configured to predict performance metrics, and/or determining computing resources needs is based on a second machine learning model configured to predict computing resources needs.

3. Apparatus according to claim 2, wherein the at least one memory and the computer program code are further configured for, with the at least one processor, causing the apparatus to perform:
   receiving, from the apparatus associated with a radio cell, data specifying cell performance metrics and/or computing resources consumption of for respective radio resources management algorithms,
   updating said first machine learning model and/or said second machine learning model based on the received performance metrics and/or computing resources consumption.

4. Apparatus according to claim 1, wherein the at least one memory and the computer program code are further configured for, with the at least one processor, causing the apparatus to perform:
   selecting, based on the cell level parameters and computing resources availability, parameters for the selected set of radio resources management algorithms,
   sending, to the apparatus associated with the radio cell, data specifying the selected parameters.

5. Apparatus according to claim 1, wherein selecting a set of radio resources management algorithms comprises selecting among at least a first beam pairing algorithm, a second beam pairing algorithm, a first frequency selective scheduling algorithm, a second frequency selective scheduling algorithm.

6. Apparatus according to claim 1, wherein the at least one memory and the computer program code are further configured for, with the at least one processor, causing the apparatus to perform sending, to the apparatus associated with the radio cell, data specifying a list of cell level parameters and computing resources availability.

7. Computer-implemented method for configuring a communication network, comprising:
   receiving, from an apparatus associated with a radio cell, data specifying cell level parameters and computing resources availability,
   selecting, based on the cell level parameters and computing resources availability, a set of radio resources management algorithms,
   sending, to the apparatus associated with the radio cell, data specifying the selected set of radio resources management algorithms,
wherein selecting a set of radio resources management algorithms comprises:
   determining performance metrics for a plurality of sets of radio resources management algorithms,
   determining computing resources needs for said plurality of sets,
   selecting one of the sets which has computing resources needs lower than available computing resources, based on the performance metrics.

8. Method according to claim 7, wherein determining performance metrics is based on a first machine learning model configured to predict performance metrics, and/or determining computing resources needs is based on a second machine learning model configured to predict computing resources needs.

9. Method according to claim 8, comprising:
   receiving, from the apparatus associated with a radio cell, data specifying cell performance metrics and/or computing resources consumption of for respective radio resources management algorithms, updating said first machine learning model and/or said second machine learning model based on the received performance metrics and/or computing resources consumption.

10. A non-transitory computer readable medium having stored thereon instructions than when executed by a computer cause the computer to perform the method of claim 7.

11. Apparatus comprising at least one processor and at least one memory, the at least one memory storing computer program code, the at least one memory and the computer program code being configured for, with the at least one processor, causing the apparatus to perform:

executing a first set of radio resources management algorithms, sending, to an apparatus associated with a communication network, data specifying cell level parameters and computing resources availability, receiving, from the apparatus associated with the communication network, data specifying a second set of radio resources management algorithms, executing the second set of radio resources management algorithms.

12. Apparatus according to claim 11, wherein the at least one memory and the computer program code are further configured for, with the at least one processor, causing the apparatus to perform:

receiving, from the apparatus associated with a communication network, data specifying a list of cell level parameters and computing resources availability, and wherein sending data specifying cell level parameters and computing resources availability is based on said list.

13. An apparatus according to claim 11, wherein the apparatus is a wireless access node.

14. Computer-implemented method comprising:

executing a first set of radio resources management algorithms, sending, to an apparatus associated with a communication network, data specifying cell level parameters and computing resources availability, receiving, from the apparatus associated with the communication network, data specifying a second set of radio resources management algorithms, executing the second set of radio resources management algorithms.

15. A non-transitory computer readable medium having stored thereon instructions than when executed by a computer cause the computer to perform the method of claim 14.

* * * * *